(12) United States Patent
Hernandez et al.

(10) Patent No.: US 6,268,300 B1
(45) Date of Patent: Jul. 31, 2001

(54) TEXTILE COATING COMPOSITIONS

(75) Inventors: Paul Caesar Hernandez, Greensboro, NC (US); Diane Marie Kosal, Midland; Matthew Quintin Roberts, Hemlock, both of MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/218,684

(22) Filed: Dec. 22, 1998

(51) Int. Cl.$^7$ .................................................. B32B 25/02
(52) U.S. Cl. ...................... 442/168; 442/169; 280/728.1
(58) Field of Search .................... 442/168, 169; 280/728.1

(56) References Cited

U.S. PATENT DOCUMENTS

| | | | |
|---|---|---|---|
| 5,338,574 | 8/1994 | O'Neil et al. | 427/387 |
| 5,789,084 | 8/1998 | Nakamura et al. | 428/447 |

FOREIGN PATENT DOCUMENTS

| | | | |
|---|---|---|---|
| 0 553 840 A1 | 8/1993 | (EP) | C09D/183/04 |
| 0 646 672 A1 | 4/1995 | (EP) | D06M/15/643 |
| 0 712 956 A1 | 5/1996 | (EP) | D06M/23/10 |

*Primary Examiner*—Elizabeth M. Cole
(74) *Attorney, Agent, or Firm*—Jennifer S. Warren

(57) ABSTRACT

A curable silicone coating composition obtained is by mixing ingredients comprising:

(A) a polyorganosiloxane having at least 2 silicon-bonded alkenyl groups per molecule, (B) a polyorganohydrogensiloxane containing at least 2 silicon-bonded hydrogen groups, (C) a platinum group metal catalyst capable of promoting the reaction between the silicon-bonded alkenyl of component (A) and the silicon-bonded reactive group of component (B), (D) a reinforcing filler (E) 0.1 to 5 percent by weight of a compound selected from the group consisting of natural dying oils and modified natural drying oils, various liquid diene compounds, and unsaturated fatty acid esters.

The curable silicone coating composition is suitable for coating textiles, especially for automotive airbags. The cured coating composition has reduced tack.

17 Claims, No Drawings

TEXTILE COATING COMPOSITIONS

This invention is concerned with textile fabrics coated with silicone rubber coating compositions. More particularly the invention is concerned with textile fabrics which are coated with silicone rubber coating compositions with reduced tack, and which are capable of maintaining a pressure barrier between two areas with a pressure differential. Such fabrics are especially useful in preparing automotive airbags.

BACKGROUND

The benefits of using silicone-coated compositions over organic polymer coating compositions on textile fabrics, include improved weatherability, ability to maintain flexibility and heat resistance of the coated textile fabrics.

Coating textile fabrics with silicone rubber may impart a variety of benefits to the coated fabric used in automotive air bags. For example in EP 553,840, Nakamura et. al describe a liquid silicone rubber coating composition for application to automotive airbags, which comprises polydiorganosiloxane having alkenyl groups, an polyorganosiloxane resin, an inorganic filler, a polyorganohydrogensiloxane, a platinum group metal catalyst, and an epoxy group-containing organosilicon compound. In EP 646,672, MaGee et. al describe a fabric impregnated with a silicone composition comprising a linear polyorganosiloxane having aliphatic unsaturation, a certain polyorganohydrogensiloxane, a catalyst promoting addition reaction, a hydrophobic silica, a flame inhibitor, and optionally an adhesion promoting agent. The latter publication also suggests the use of the composition for fabrics used in the construction of airbags.

It is often desirable to provide coated textile fabrics with a finish which is relatively smooth and free of surface tack. A particular example relates to the use of coated textile fabrics in the manufacture of airbags for use in automobiles. When such airbags are deployed, due to the use of an explosive charge, friction is inevitable. Such friction takes place where textile rubs over textile, and also where textile comes into contact with the interior of the automobile or a driver or passenger in an automobile during or after deployment. The amount of friction created can in some circumstances slow down the deployment of the airbag or cause burns to the skin of the driver or passenger. Therefore it is desirable to provide coated textile fabrics for use in automotive airbags which have a relatively low coefficient of friction.

In EP 0712956, Saitoh et. al describe a coating composition for a fabric, comprising a rubber component, a solvent, and a powder of an inorganic compound or an organic compound having an average particle size of from 0.5 to 20 $\mu$m, preferably at 20 to 50 parts by weight, per 100 parts of the rubber component. The coating composition is said to improve the feeling of a rubber coated film by eliminating the sticky feeling of the rubber coated film. Examples of the inorganic or organic powders are aluminium hydroxide, mica, polymethyl-silsesquioxane, carbon, polyamide and polyfluoroethylene. Preferred powders are spherical, as a flaky powder is said to be liable to weaken the rubber properties. Particles with an average size over 20 $\mu$m are stated as giving a poor coating property. The presence of a solvent is indicated to be very important, as it has a function of uniformly spreading the powder.

Solvents are preferably avoided in the coating industry in general. However, a drawback of some solventless silicone rubber compositions is that when coated onto fabrics the surface of the applied film presents some residual tack even after cure of the silicone rubber. When left as is, this residual tack impairs the processability during such operations as sewing and also causes adjacent films of the coating to stick to each other during storage of the folded fabric. These problems have made it necessary to dust the surface of the applied films with, for example, talc, calcium carbonate, or clay.

Nakamura et al. in U.S. Pat. No. 5,789,084 describe a curable liquid silicone rubber coating composition including (A) 100 pts. by weight of a polydiorganosiloxane that contains at least 2 alkenyl groups in each molecule; (B) 5 to 100 pts. by weight of polyorganosiloxane resin; (C) 5 to 100 pts. by weight of an inorganic filler; (D) an polyorganohydrogensiloxane that contains at least 2 silicon-bonded hydrogen atoms in each molecule in a quantity that affords a value from 0.6:1 to 20:1 for the ratio of the number of moles of silicon-bonded hydrogen in this component to the number of moles of alkenyl in component A; (E) a platinum group catalyst in a quantity that affords 0.1 to 500 weight parts platinum group metal for each one million weight pts. component (A); (F) 0.1 to 20 weight parts of an epoxy-functional organosilicon compound; and (G) 0.1 to 5 weight parts an organotitanium compound. This composition can be used for thin coatings on synthetic fabrics, without using a dilution solvent.

SUMMARY OF THE INVENTION

The curable liquid silicone rubber composition of the present invention contains a compound selected from natural dying oils and modified natural drying oils, various liquid diene compounds, and unsaturated fatty acid esters. An object of the invention is to provide uncured compositions that exhibit good capacity to be coated out into thin films on synthetic fabrics without the use of an organic solvent. Another object of this invention is to provide cured compositions that adhere to synthetic fabric and exhibit low surface tack. Another object of the invention is to provide a coated synthetic fabric suitable for use in automotive airbags.

DETAILED DESCRIPTION OF THE INVENTION

The curable liquid silicone rubber composition of the present invention is obtained by mixing ingredients comprising:
- (A) a polyorganosiloxane having at least 2 silicon-bonded alkenyl groups per molecule,
- (B) a polyorganohydrogensiloxane containing at least 2 silicon-bonded hydrogen groups,
- (C) a platinum group metal catalyst capable of promoting the reaction between the silicon-bonded alkenyl groups of compound A and the silicon-bonded hydrogen group of compound B,
- (D) a reinforcing filler,
- (E) 0.1 to 5 percent by weight of a compound selected from the group consisting of natural dying oils and modified natural drying oils, various liquid diene compounds, and unsaturated fatty acid esters.

This invention is also silicone rubber-coated fabric which has been coated with the curable silicone composition, and cured.

The polyorganosiloxane (A) used in the present composition is a liquid and contains at least 2 alkenyl groups in each molecule. This alkenyl is exemplified by vinyl, allyl, methacryl, and hexenyl. The non-alkenyl Si-bonded organic groups present in (A) can be exemplified by alkyl groups such as methyl, ethyl, propyl, butyl, pentyl, isopropyl, isobutyl, cyclopentyl, and cyclohexyl; aryl groups such as phenyl and naphthyl; aralkyl groups such as benzyl and 1-phenylethyl; halogenated alkyl groups such as chloromethyl, 3-chloropropyl, 3,3,3-trifluoropropyl, and nonafluorobutylethyl; halogenated aryl groups such as 4-chlorophenyl, 3,5-dichlorophenyl, and 3,5-difluorophenyl; and aryl groups substituted by halogenated alkyl, such as 4-chloromethylphenyl and 4-trifluoromethylphenyl. The molecular structure of this polyorganosiloxane (A) will generally be a straight chain, but may include partial chain branching. The alkenyl may be bonded in terminal or pendant position on the polyorganosiloxane. While the viscosity of polyorganosiloxane (A) at 25° C. is such that it is a pumpable liquid and can spread out on the fabric without solvent. The viscosity preferably is in the range from 100 to 100,000 mPa.s based on considerations. More preferably, the viscosity of component (A) at 25° C. is in the range of 1000 to 50,000 mPa.s.

The polyorganosiloxane (A) is exemplified by dimethylvinylsiloxy-endblocked polydimethylsiloxane, dimethylvinylsiloxy-endblocked dimethylsiloxane-methylphenylsiloxane copolymers, dimethylvinylsiloxy-endblocked dimethylsiloxane-3,3,3-trifluoropropylmethylsiloxane copolymers, dimethylvinylsiloxy-endblocked dimethylsiloxane-methylvinylsiloxane copolymers, trimethylsiloxy-endblocked dimethylsiloxane-methylvinylsiloxane copolymers, and trimethylsiloxy-endblocked dimethylsiloxane-hexenylmethylsiloxane copolymers.

The polyorganohydrogensiloxane of component (B) acts as a cross-linking agent in the composition of the present invention. Specifically, in the presence of the platinum type catalyst of component (C), the hydrogen atoms bonded to silicon atoms in component (B) undergo an addition reaction with the alkenyl groups bonded to silicon atoms in component (A); as a result, the composition of the present invention is cross-linked and cured. It is necessary that the polyorganosiloxane of component (B) have at least two hydrogen atoms bonded to silicon atoms in each molecule. It will be recognized, however, by those skilled in the art that if there are only two alkenyl groups on component (A), there must be more than two silicon-bonded hydrogen groups on component (B) to get a crosslinked rubber. Organic groups other than these hydrogen atoms bonded to silicon atoms which may be present in this component include alkyl groups such as methyl groups, ethyl groups or propyl groups; aryl groups such as phenyl groups or tolyl groups; and substituted alkyl groups such as 3,3,3-trifluoropropylgroups or 3-chloropropyl groups.

The molecular structure of component (B) may be linear, linear including branching, cyclic or network-form. There are no particular restrictions on the molecular weight of component (B); however, it is desirable that the viscosity at 25° C. be 3 to 10,000 mPa.s. Furthermore,the amount of component (B) that is added to the composition is an amount which is such that the ratio of the number of moles of hydrogen atoms bonded to silicon atoms in the present composition to the number of moles of alkenyl groups bonded to silicon atoms is in the range of 0.5:1 to 15:1, and preferably in the range of 1:1 to 10:1. If this molar ratio is less than 0.5, curing of the present composition becomes insufficient, while if this molar ratio exceeds 15:1, excess hydrogen gas is evolved so that foaming occurs.

Component (B) is exemplified by the following: trimethylsiloxy-endblocked polymethydrogensiloxanes, trimethylsiloxane-endblocked dimethylsiloxane-methylhydrogensiloxane copolymers, dimethylphenylsiloxy-endblocked methylphenylsiloxane-methylhydrogensiloxane copolymers, cyclic polymethylhydrogensiloxane, and copolymers composed of dimethylhydrogensiloxy and $SiO_{4/2}$ units.

The platinum group metal catalyst (C) used in the composition according to the present invention accelerates the addition reaction between the alkenyl in component (A) and the silicon-bonded hydrogen in component (B). This component can be exemplified by platinum compounds, rhodium compounds, and palladium compounds. Platinum compounds are preferred for component (C), and component (C) can be specifically exemplified by chloroplatinic acid, alcohol-modified chloroplatinic acid, chloroplatinic acid-olefin complexes, and diketonate complexes of platinum. The particular platinum complex catalyst can be used directly by itself, or can be used in solution form as afforded by dilution with solvent, or can be used in solid form as afforded by support on the surface of a solid, or can be used in particulate form as afforded by dissolution or dispersion in thermoplastic resin. This component should be used in a catalytic quantity, which will vary with the particular species selected. In the case of use of a platinum compound as component (C), the platinum compound is in general preferably used in an amount that provides from 0.1 to 1,000 ppm, and preferably 1 to 50 ppm platinum atoms referred to the weight of component (A). Where the fabric is coated and cured on a continuous coating line, the catalyst level must be selected to allow for dry cure of the rubber with the line speed and temperature of the coating process.

Component (D) is a reinforcing filler, which is preferably hydrophobic. Examples of suitable fillers include silica, titanium dioxide, ground quartz, calcium carbonate, alumino silicates, organosilicon resins. Preferred are silica fillers, most preferably fumed or precipitated silica fillers, as they have the best reinforcing properties. The average particle size of these fillers may be such that the diameter ranges from 0.1 to 20 $\mu$m, preferably from 0.2 to 5 $\mu$m, most preferably 0.4 to 2.5 $\mu$m.

The surface of the filler particles is preferably rendered hydrophobic in order to make the filer more compatible with the compositions used in the present invention. Rendering the filler particles hydrophobic may be done either prior to or after dispersing the filler particles in component (A). This can be effected by pre-treatment of the filler particles with fatty acids, reactive silanes or reactive siloxanes. Examples of suitable hydrophobing agents include stearic acid, dimethyldichlorosilane, divinyltetramethyl disilazane, trimethylchlorosilane, hexamethyldisilazane, hydroxyl end-blocked or methyl end-blocked polydimethylsiloxanes, siloxane resins or mixtures of two or more of these. Other hydrophobing agents known in the art for such purposes may also be used, but the above exemplified materials are the most effective. Fillers which have already been treated with such compounds are commercially available from a number of sources. Alternatively, the surface of the filler may be rendered hydrophobic in situ, that is, after the filler has been dispersed in the polyorganosiloxane polymer material. This may be effected by adding to the polysiloxane component prior to, during or after the dispersion of the filler, an appropriate amount of a hydrophobing agent of the kind described above as reactive silanes or siloxanes, and heating the mixture sufficiently to cause reaction, e.g. to a temperature of at least 40° C. The quantity of hydrophobing agent to be employed will depend for example on the nature of the agent and of the filler, and the amount of hydrophobicity required. Sufficient hydrophobic agent should be employed to endow the filler with at least a discernible degree of hydrophobicity.

Silicone resins may also be used as component (D), for example an MQ resin, that is, a resin consisting of monovalent siloxane units M and quadrivalent siloxane units Q and is preferably a resin consisting essentially of M units $R^2R^1_2SiO_{1/2}$ and $R^1_3SiO_{1/2}$ and Q units $SiO_{4/2}$ in which $R^1$ and $R^2$ are as defined above. Preferably $R^2$ is a vinyl group, with no more than 10% by weight of vinyl groups per molecule and more preferably 1 to 5% by weight of vinyl groups per molecule. The resin may be in solid or liquid form although it is preferred that the ratio of M to Q units to be such that the resin is a solid at ambient temperature and pressure.

The amount of component (D) used will be limited by the viscosity of the resulting curable liquid silicone rubber. It is desirable to keep the viscosity less than about 100,000 mPa.s at 25° C. to allow for coating of the curable liquid silicone rubber on textile. The amount of component (D) is typically from about 2 to 35 weight percent, based on the total formulation, and preferably from 5 to 20 weight percent.

Component (E) is a compound selected from the group consisting of natural drying oils and modified natural drying oils, various liquid diene compounds, and unsaturated fatty acid esters. These compounds cure to a dry surface by reacting with oxygen in the air at ambient conditions. Examples of these compounds include the natural dying oils, such as tung oil, linseed oil, vernonia oil, and oiticica oil; and modified natural drying oils such as boiled linseed oil and dehydrated castor oil; various liquid diene compounds such as 1,3-hexadiene or polybutadiene, and fatty acid esters which are unsaturated, and preferably have more than 10 carbon atoms. In the present invention, tung oil and oiticica oil are preferred because they provide the lowest tack surfaces. Most referable is tung oil, also known as China wood oil, a yellow oil obtained from Chinese seeds. Tung oil consists chiefly of the glycerides of oleic and oleomargaric acids.

The effective amount of component (E) is within a range of from about 0.1 to 5 weight percent based on the total weight of the composition. The preferred amount is from 0.5 to 1 weight percent based on the total weight of the composition. The lower range of component (E) is determined by the amount which allows a reduced tack surface. The upper range of component (E) is limited by a decrease in adhesion to the textile. In some cases, such as with linseed oil, the upper limit is less than 5 weight percent, and is determined by a deterioration of the reduced tack effect.

Component (E) often separates from the other components of the composition upon storage. Therefore it is preferred that component (E) be stored in a package separate from the rest of the curable liquid silicone rubber composition. The curable silicone coating composition of this invention is prepared by mixing component (E) into the rest of the composition just prior to coating the composition onto a textile.

In addition to the ingredients above, additional additives and fillers may be useful for improving physical properties. For example a second, non-reinforcing filler selected from materials such as mica, aluminum trihydrate, aluminum oxide, or magnesium oxide may be added. Making such nonreinforcing materials hydrophobic may be done as described for the reinforcing filler. The amount of nonreinforcing filler used will be limited by the change in viscosity and ease of spreading of the curable liquid silicone rubber onto the textiles. Various optional components, for example, pigments, heat stabilizers, adhesion promoters, and so forth, can be admixed to the curable liquid silicone rubber composition insofar as the objects of the invention are not impaired.

It is frequently useful for curable liquid silicone rubber compositions to contain a cure inhibitor. Cure inhibitors are well known in the art and are used to improve the stability and lengthen the working time of the curable liquid silicone rubber composition prior to curing. Useful cure inhibitors exemplified by alkyne alcohols such as 3-methyl-1-butyn-3-ol, 3,5-diemethyl-1-hexyne-3-ol, phenylbutynol, and 1-ethynyl-1-cyclohexanol; ene-yne compounds such as 3-methyl-3-penten-1-yne, 3,5dimethyl-3-hexen-1-yne; tetramethyltetrahexenylcyclotetrasiloxane and benzotriazole. The cure inhibitor is generally used at 0.01 to 10 weight parts per 100 weight parts component (A).

The composition of the present invention can be prepared simply by the preparation of an essentially homogeneous mixture using a mixer such as, for example, a kneader mixer, kneader mixer equipped with a ram cover, or a Ross mixer. Various techniques known in the art, such as first massing the reinforcing filler and any hydrophobing agents with a small fraction of the polyorganosiloxane before adding the rest of the components may be useful. In order to prevent premature gelling or crosslinking of the present composition, it may be useful to split the components into three parts, with one part containing the polyorganohydrogensiloxane crosslinking component (B), one part containing the curing catalyst (C), and a third part containing the oxygen curing component (E) as described above.

Silicone rubber-coated textiles can be prepared by coating the present composition on a fiber fabric, such as synthetic fabrics, and then curing the composition. Useful synthetic fabrics are exemplified by fabrics made from polyamide fibers such as nylon 6, nylon 66, and nylon 46; fabrics made from aramid fibers; fabrics made from polyesters, for which the typical example is polyethylene terepthalate; fabrics made from polyetherimide fibers; and fabrics made from carbon fibers. Most preferred are fabrics made of nylon 66 fibers.

To produce the silicone rubber-coated textile of the present invention, the present curable composition is coated onto the synthetic fabric followed by introduction into a hot-air drying oven for heating and curing. The curable liquid silicone rubber composition is generally applied to the fabric at a coat weight not exceeding 80 $g/m^2$. The heating and curing step affords a flexible coated fabric having a cured silicone rubber coating bonded tightly to the synthetic fabric at an adhesive strength of at least 1.5 kgf/cm. Typical oven temperatures for curing the curable liquid silicone rubber composition on the fabric range between about 120° C. to 205° C.

EXAMPLES

The following examples are presented for illustrative purposes and should not be construed as limiting the present invention, which is properly set out in the claims.

Materials

The following materials were used in formulating the examples that follow:

Polymer 1-Dimethylvinylsilioxy-terminated Dimethyl Siloxane, with 0.11 to 0.23 wt % vinyl, and a viscosity of 7000 to 12000 mPa.s Polymer 2-Dimethylvinylsilioxy-terminated Dimethyl Siloxane, with 0.18 to 0.34 wt % vinyl, and a viscosity of 1800 to 2400 mPa.s.

Crosslinker Trimethylsiloxy-terminated Dimethyl, Methylhydrogen Siloxane, SIH as H, 1.00 to 1.12 wt %, with a viscosity of 25to 40 mPa.s Catalyst 1 percent 1,3-Diethenyl-1,1,3,3-Tetramethyldisiloxane Complex of Platinum in Dimethylvinylsiloxy-terminated Dimethyl Siloxane, Inhibitor 1-ethynyl-1-cyclohexanol Reinforcing filler-Cabosil ® MS-75, Cabot Corp. Tuscola, Ill. A reinforcing amorphous silica which has a surface area of 240–270 square meters per gram ($M^2/g$).

Nonreinforcing Filler 1 Micral 855, Huber Chemical, Atlanta Ga., An alumina hydrate having an average particle size of 1.5–2.5 microns Nonreinforcing Filler 2 Mica (W32S-SM-ML), methacryl/Organosilane Modified Mica from Franklin Industrial Minerals, Franklin, N.C.

Nonreinforcing Filler 3 Celite ®Superflos, Celite (UK) Limited, North Humberside UK, Flux calcined diatomaceous earth which may contain up to 63% crystalline silica in the form of cristobalite and quartz.

Hydrophobing agent 1 Hexamethyldisilazane

Hydrophobing agent 2 Hydroxy-terminated Dimethyl Siloxane, with viscosity of 38 to 45 mPa.s at 25 ° C., and total hydroxyl as OH 2.6 to 3.6%

Hydrophobing agent 3 mixture containing alpha-Hydroxy-, omega-Methoxy-terminated Dimethyl, Methylvinyl Siloxane, and Hydroxy-terminated Dimethyl, Methylvinyl Siloxane Tung oil, Sea-Land Chemical Co., Westlake Ohio Linseed oil Adhesion promoter 1 Glycidoxypropyltrimethoxysilane Adhesion promoter 2 Tetraisopropoxy Titanate, du Pont Specialty Chemicals, Wilmington Del.

Sample Preparation—Part A

For each sample a masterbatch was first prepared by massing the fillers, the filler treating agents and about two thirds of polymers 1 and 2 in a sigma blade mixer for about one to two hours at about 160° C., under vacuum of at least 67 kPa. The remainder of the polymers was then added and the mixture cooled to below 80° C. before the catalyst and adhesion promoter were added.

Sample Preparation—Part B

The materials were mixed at room temperature in a closed container on a roller until homogeneous.

Sample Preparation—Part C

The part C in the formulations was 100 percent of component (E).

Procedure for Coating Fabric

Into an appropriate mixing container were placed 100 gm of part A and 20 gm of part B. When the component (E) was used, it was added to the mixer at the amount specified in the example. The mixture of part A and part B, with component (E) was mixed until essentially homogeneous, usually 2–3 minutes. The mixture was then coated on a 420 denier nylon fabric, secured onto a Werner Mathis lab coater, Werner Mathis USA, Concord, N.C. The material was coated to approximately 0.0339 kg/$m^2$ in coating weight. The coated material was then cured in a 150 C oven for 3 minutes. The coated fabric was allowed to stabilize for 24 hours minimum prior to testing the adhesion of the silicone to the fabric.

Scrub Test

A scrub test based on ISO 5981 was used to test the coated materials for adhesion of the rubber to the fabric. According to this test, a coated fabric sample is given repeated flexes under a specified force using a scrub testing machine meeting the ISO 5981 standard. The surface of the coated fabric was examined after a specified number of scrubs for signs of delamination, such as flaking or pinholes. Test failure was determined by the evidence of pinholes seen through the coating when observed on a light box. The number of scrubs prior to failure is reported for the examples. A higher number indicated better adhesion of the silicone to the substrate.

Tongue Tear of the Coated Fabric

A tear strength by a tongue method, based on ASTM D2261-83 was used to test the strength of the coated fabric. The peak force needed to tear the fabric 0.76 cm at a precut slit is reported for the examples.

Blocking Test

The blocking test is an indication of how two pieces of coated fabric, placed coated sides together, will stick together under heat and pressure. GM T469 is a test method developed by General Motors, Detroit Mich., that measures the ability of a coated fabric to separate under 50 grams of weight after placed coated side together under a 9.07 kg weight in an oven for 7 days at 100° C. After seven days, the samples are allowed to cool. One tab of the samples is placed in a clamp. A 50 gm weight is attached to the other tab, and allowed to peel the sample apart at 180°. If the sample does not pull apart within 30 seconds, it is recorded as a fail. If the sample passes at 50 grams, the test is repeated with a lower weight, such as 20 or 30 gm weight. The result of pass or fail is recorded for the samples at the weights at which they were tested.

Example 1, with Tung Oil and Comparison Example 1

A two-part formulation was made with the following ingredients:

| Part A: | Polymer 1 | 56.00% | Part B: | Polymer 1 | 78.71% |
|---|---|---|---|---|---|
| | Polymer 2 | 0.73% | | Crosslinker | 14.84% |
| | Reinforcing Filler | 10.07% | | Hydrophobing agent 3 | 2.19% |
| | H$_2$O | 0.60% | | Adhesion promoter 1 | 3.93% |
| | Hydrophobing agent 1 | 2.24% | | Inhibitor | 0.33% |
| | Catalyst | 0.41% | | | |
| | Adhesion promoter 2 | 0.23% | | | |

| | Comparison ex. 1 Without Tung Oil | Example 1 With Tung Oil |
|---|---|---|
| Part A | 100 parts | 100 parts |
| Part B | 20 parts | 20 parts |
| Tung Oil | 0 parts | 1.2 parts |
| SiH/Vi | 4.5/1 | 4.5/1 |

|   | -continued |   |
|---|---|---|
| Scrubs (pass) | 750 | 2000 |
| Tongue Tear, N | 218 | 381 |
| Blocking Test | failed at 50 gm | passed at 30 gm |

Example 2 an Comparison Example 2, using Aluminum Trihydrate

| Part A: | Polymer 1 | 45.83% | Part B: | Polymer 2 | 78.71% |
|---|---|---|---|---|---|
|  | Polymer 2 | 25.57% |  | Crosslinker | 14.84% |
|  | Reinforcing filler | 8.24% |  | Hydrophobing agent 3 | 2.19% |
|  | Nonreinforcing filler 1 | 13.82% |  | Adhesion promoter 1 | 3.93% |
|  | $H_2O$ | 1.23% |  | Inhibitor | 0.33% |
|  | Hydrophobing agent 1 | 4.90% |  |  |  |
|  | Catalyst | 0.41% |  |  |  |
|  | Adhesion promoter 2 | 0.23% |  |  |  |

|   | Comparison ex. 2<br>Without Tung Oil | Example 2<br>With Tung Oil |
|---|---|---|
| Part A | 100 parts | 100 parts |
| Part B | 20 parts | 20 parts |
| Tung Oil | 0 parts | 1.2 parts |
| SiH/Vi | 4.5/1 | 4.5/1 |
| Scrubs (pass) | 200 | 1750 |
| Tongue Tear, N | 218 | 295 |
| Blocking Test | failed at 50 gm | passed at 20 gm |

Example 3 and Comparison Example 3, using Mica

| Part A: | Polymer 1 | 51.31% | Part B: | Polymer 2 | 78.71% |
|---|---|---|---|---|---|
|  | Polymer 2 | 28.53% |  | Crosslinker | 14.84% |
|  | Reinforcing filler | 9.23% |  | Hydrophobing agent 3 | 2.19% |
|  | Nonreinforcing filler 2 | 7.73% |  | Adhesion promoter 1 | 3.93% |
|  | $H_2O$ | 0.52% |  | Inhibitor | 0.33% |
|  | Hydrophobing agent 1 | 2.05% |  |  |  |
|  | Catalyst | 0.41% |  |  |  |
|  | Adhesion promoter 2 | 0.23% |  |  |  |

|   | Without Tung Oil | With Tung Oil |
|---|---|---|
| Part A | 100 parts | 100 parts |
| Part B | 20 parts | 20 parts |
| Tung Oil | 0 parts | 1.2 parts |
| SiH/Vi | 4.5/1 | 4.5/1 |
| Scrubs (pass) | 1000 | 2000 |
| Tongue Tear, kg | 44.6 | 52.4 |
| Blocking Test | failed at 50 gm | passed at 30 gm |

Example 4
Comparison Between Linseed Oil and Tung Oil

| Part A: | Polymer 1 | 46.29% | Part B: | Polymer 1 | 74.65% |
|---|---|---|---|---|---|
|  | Polymer 2 | 25.84% |  | Crosslinker | 18.66% |
|  | Reinforcing filler | 8.32% |  | Hydrophobing agent 3 | 2.33% |
|  | $H_2O$ | 1.18% |  | Adhesion promoter 1 | 4.00% |
|  | Hydrophobing agent 1 | 4.73% |  | Inhibitor | 0.36% |
|  | Catalyst | 0.42% |  |  |  |
|  | Adhesion promoter 2 | 0.23% |  |  |  |

In the following compositions, test samples were made by coating a fabric 20.32 cm by 20.32 cm square with approximately 1.4 grams of rubber and curing.

|  | 4-1 | 4-2 | 4-3 | 4-4 | 4-5 |
|---|---|---|---|---|---|
| Part A | 100 parts | 100 parts | 100 parts | 100 parts | 100 parts |
| Part B | 20 parts | 20 parts | 20 parts | 20 parts | 20 parts |
| Linseed Oil | 0.0 | 0.6 parts | 1.2 parts | 2.4 parts |  |
| Tung oil |  |  |  |  | 1 part |
| Scrubs passed | 1250 | 2000 | 1500 | 1250 | 2000 |

We claim:

1. A silicone rubber-coated textile prepared by coating a synthetic fabric substrate with a composition formed by mixing ingredients consisting essentially of:
   (A) a polyorganosiloxane having at least 2 silicon-bonded alkenyl groups per molecule,
   (B) a polyorganohydrogensiloxane containing at least 2 silicon-bonded hydrogen groups,
   (C) a platinum group metal catalyst capable of promoting the reaction between the silicon-bonded alkenyl of component A and the silicon-bonded reactive group of component B,
   (D) a reinforcing filler,
   (E) 0.1 to 5 percent by weight, based on the total weight of components A through E, of a compound selected from the group consisting of natural drying oils and modified natural drying oils, liquid diene compounds, and unsaturated fatty acid esters, and curing the composition onto the textile.

2. The silicone rubber-coated textile of claim 1 where the textile is coated at a coat weight not exceeding about 80 g/m$^2$.

3. The silicone rubber-coated textile of claim 1 where the synthetic fabric substrate is made from fibers selected from the group consisting of polyamide fibers, aramid fibers, polyesters, polyetherimide fibers, and carbon fibers.

4. The silicone rubber-coated textile of claim 1 where the synthetic fabric substrate is made from fibers selected from the group consisting of nylon 6, nylon 66, and nylon 46.

5. The silicone rubber-coated textile of claim 1 where the viscosity of component (A) is in the range of between 100 and 100,000 mPa·s at 25° C.

6. The silicone rubber-coated textile of claim 1 where the polyorganosiloxane is selected from the group consisting of dimethylvinylsiloxy-endblocked polydimethylsiloxane, dimethylvinylsiloxy-endblocked dimethylsiloxane-methylphenylsiloxane copolymers, dimethylvinylsiloxy-endblocked dimethylsiloxane-3,3,3-trifluoropropylmethylsiloxane copolymers, dimethylvinylsiloxy-endblocked dimethylsiloxane-methylvinylsiloxane copolymers, trimethylsiloxy-endblocked dimethylsiloxane-methylvinylsiloxane copolymers, and trimethylsiloxy-endblocked dimethylsiloxane-hexenylmethylsiloxane copolymers.

7. The silicone rubber-coated textile of claim 1 where component (B) provides 0.5 to 15 moles of hydrogen for each mole of alkenyl in component (A).

8. The silicone rubber-coated textile of claim 1 where component (B) is selected from the group consisting of trimethylsiloxy-endblocked polymethydrogensiloxanes, trimethylsiloxane-endblocked dimethylsiloxane-methylhydrogensiloxane copolymers, dimethylphenylsiloxy-endblocked methylphenylsiloxane-methylhydrogensiloxane copolymers, cyclic polymethylhydrogensiloxane, and copolymers composed of dimethylhydrogensiloxy and $SiO_{4/2}$ units.

9. The silicone rubber-coated textile of claim 1 where component (C) is selected from the group consisting of platinum compounds, rhodium compounds, and palladium compounds.

10. The silicone rubber-coated textile of claim 1 where component (C) is selected from the group consisting of chloroplatinic acid, alcohol-modified chloroplatinic acid, chloroplatinic acid-olefin complexes, and diketonate complexes of platinum.

11. The silicone rubber-coated textile of claim 1 where component (D) is selected from fumed silica and precipitated silica and has an average particle size of 0.1 to 20 μm.

12. The silicone rubber-coated textile of claim 1 where component (E) is selected from the group consisting of tung oil, linseed oil, vernonia oil, oiticica oil, boiled linseed oil and dehydrated castor oil.

13. The silicone rubber-coated textile of claim 1 where component (E) is selected from tung oil and oiticica oil.

14. The silicone rubber-coated textile of claim 1 where component (E) is added within a range of 0.5 to 1 weight percent, based on the total weight of components (A) through (E).

15. The silicone rubber-coated textile of claim 1 where component (E) comprises 0.5 to 1.2 weight percent of linseed oil, based on the total weight of the composition.

16. The silicone rubber-coated textile of claim 1 where component (E) is a liquid diene compound, selected from 1,3 hexadiene and polybutadiene.

17. The silicone rubber-coated textile of claim 1 where component (E) is an unsaturated fatty acid ester, having more than 10 carbon atoms.

* * * * *